(12) United States Patent
Weaver

(10) Patent No.: US 8,982,424 B2
(45) Date of Patent: Mar. 17, 2015

(54) METHOD OF PRINTING A PRODUCT CODE WITH A MODIFIED CHARACTER

(75) Inventor: Robert Weaver, Sandy Springs, GA (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 13/983,959

(22) PCT Filed: Feb. 8, 2012

(86) PCT No.: PCT/US2012/024223
§ 371 (c)(1),
(2), (4) Date: Aug. 6, 2013

(87) PCT Pub. No.: WO2012/109294
PCT Pub. Date: Aug. 16, 2012

(65) Prior Publication Data
US 2013/0314751 A1    Nov. 28, 2013

Related U.S. Application Data

(60) Provisional application No. 61/440,456, filed on Feb. 8, 2011.

(51) Int. Cl.
| | | |
|---|---|---|
| *H04N 1/40* | (2006.01) | |
| *G06K 15/02* | (2006.01) | |
| *G07D 7/00* | (2006.01) | |
| *G06K 15/00* | (2006.01) | |
| *B42D 25/00* | (2014.01) | |

(52) U.S. Cl.
CPC .......... *G06K 15/1827* (2013.01); *G07D 7/0033* (2013.01); *G06K 15/4095* (2013.01); *B42D 25/00* (2013.01); *B42D 2035/08* (2013.01)
USPC ........................................................ 358/3.28

(58) Field of Classification Search
CPC .......... G06Q 30/06; G06Q 50/22; G09F 3/00; G09F 13/20; G06K 19/14; G06K 7/12; G06K 19/06056; G06K 7/1434; G06K 1/121; G03H 1/0011; G03H 2250/40
USPC ............... 358/3.28; 235/375, 462.12, 462.04, 235/487; 705/44, 318
See application file for complete search history.

(56) References Cited

U.S. PATENT DOCUMENTS

| | | | |
|---|---|---|---|
| 6,734,887 B2 | 5/2004 | Field | |
| 7,025,269 B2 | 4/2006 | Marshall | |
| 7,644,281 B2 | 1/2010 | Deguillaume et al. | |
| 7,712,665 B2 | 5/2010 | Ortiz et al. | |
| 7,823,768 B2 * | 11/2010 | Self et al. | 235/375 |
| 7,878,549 B2 | 2/2011 | Simske et al. | |
| 2004/0075869 A1 | 4/2004 | Hilton et al. | |
| 2006/0008115 A1 | 1/2006 | Patton et al. | |
| 2007/0221732 A1 | 9/2007 | Tuschel et al. | |
| 2008/0165387 A1 | 7/2008 | Wu | |

(Continued)

*Primary Examiner* — Charlotte M Baker
(74) *Attorney, Agent, or Firm* — Joseph A. Yosick

(57) ABSTRACT

A method of printing a modified product code includes providing a printer and a substrate. An initial product code is determined. The initial product code includes a plurality of unmodified characters. A modified product code is determined. The modified product code includes at least one modified character that is different from a corresponding one of the plurality of unmodified characters of the initial product code. The modified character is a function at least in part by of initial product code. The printer is controlled to print the modified product code on the substrate.

25 Claims, 5 Drawing Sheets

(56) References Cited

U.S. PATENT DOCUMENTS

| | | |
|---|---|---|
| 2009/0034010 A1 | 2/2009 | Lapstun et al. |
| 2010/0134916 A1 | 6/2010 | Kawabe |
| 2010/0134919 A1 | 6/2010 | Wilcox et al. |
| 2010/0202024 A1 | 8/2010 | Carey |
| 2010/0231932 A1 | 9/2010 | Green |

* cited by examiner

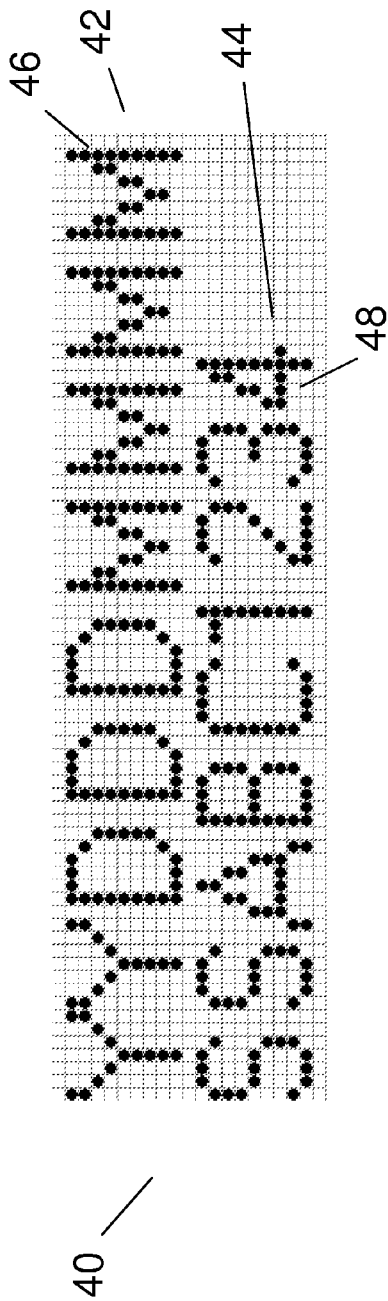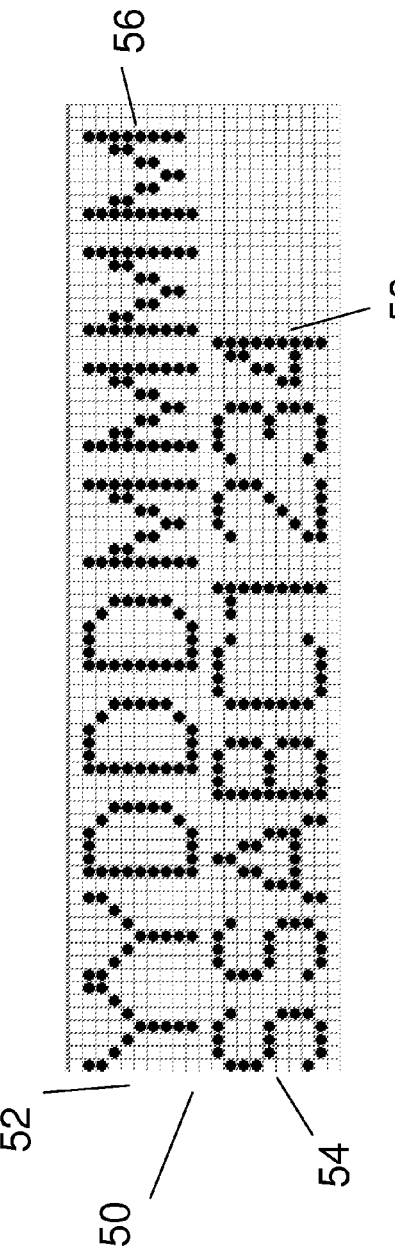

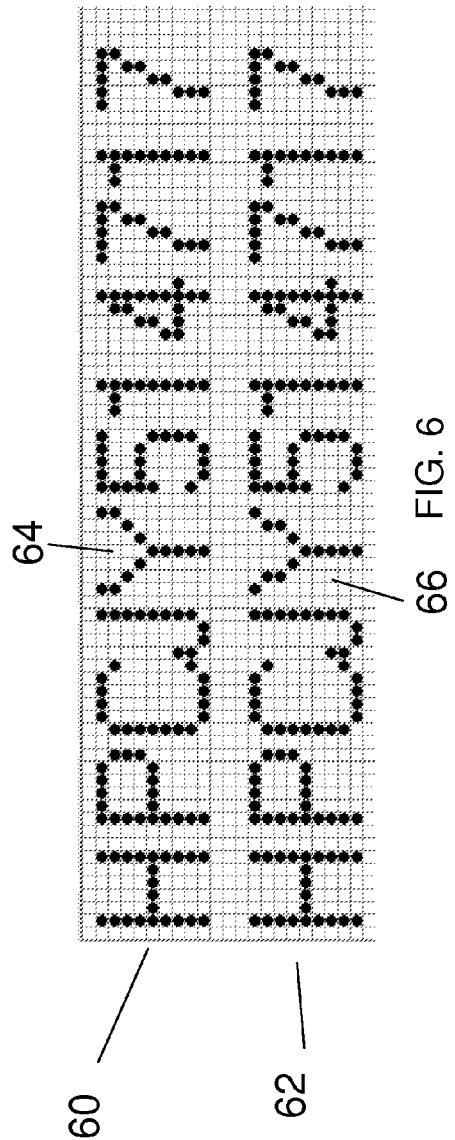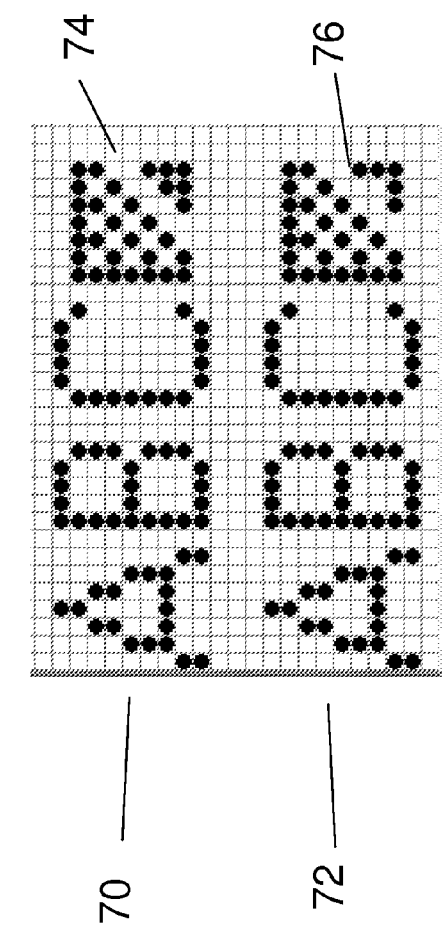
FIG. 6
FIG. 7

METHOD OF PRINTING A PRODUCT CODE WITH A MODIFIED CHARACTER

RELATED APPLICATIONS

This application claims priority under 35 U.S.C. § 371 from PCT Application No. PCT/US2012/024223, filed in English on Feb. 8, 2012, which claims the benefit of U.S. Provisional Application No. 61/440,456 filed Feb. 8, 2011, the disclosures of both are incorporated herein by reference in their entireties.

BACKGROUND

The present disclosure relates to a method of printing a product code to help detect counterfeit items.

Counterfeit items are a large problem in many industries, particularly in developing countries. A variety of methods have been used to allow the verification of the authenticity of items, including holographic labels, RFID tags, and overt and covert codes. Although these methods may provide a way to detect counterfeit items, they also involve additional costs and/or complexity to the production process.

BRIEF SUMMARY

The present disclosure provides a method of printing a product code to help detect counterfeit items. The product code includes a modified character that can be used to detect if the item is counterfeit.

In one aspect, a method of printing a modified product code includes providing a printer and a substrate. An initial product code is determined. The initial product code includes a plurality of unmodified characters. A modified product code is determined The modified product code includes at least one modified character that is different from a corresponding one of the plurality of unmodified characters of the initial product code. The modified character is a function at least in part by of initial product code. The printer is controlled to print the modified product code on the substrate.

A product with counterfeit protection includes a consumer product and a product code printed on the consumer product. The product code includes a plurality of characters selected from a set of unmodified characters and a covert code. The covert code includes at least one modified character that is different from an unmodified character from the set of unmodified characters and is a function at least in part of the characters of the product code.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 4 shows a second embodiment of a standard printed product code

FIG. 5 shows an embodiment of the printed code of FIG. 4 with a modified character in each line.

FIG. 6 shows an embodiment of a standard code on the first line and an embodiment of a modified code in the second line.

FIG. 7 shows an embodiment of a standard code with an image on the first line and an embodiment of a modified code in the second line.

DETAILED DESCRIPTION

Figure 1:
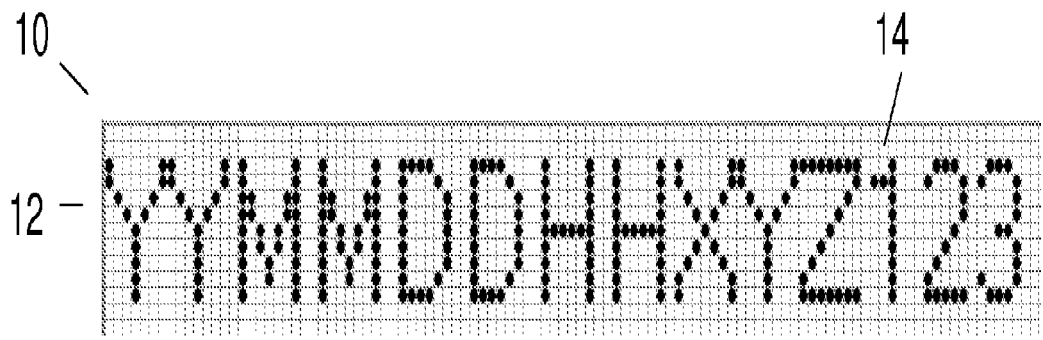
FIG. 1 shows an embodiment of a standard printed product code.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

A variety of methods have been used to allow the verification of the authenticity of items. Although previous methods may provide a way to detect counterfeit items, they also involve additional costs and/or complexity to the production process. The present disclosure provides a method of printing a product code to help detect counterfeit items. The product code includes a modified character that can be used to detect if the item is counterfeit. The method does not require any additional equipment or materials beyond the printer used to provide the existing code on a product, and thus has advantages over prior art methods.

In one aspect, the method of printing a product code includes providing a printer and a substrate. The printer may be any device suitable for printing a code on a substrate, including continuous ink jet, thermal ink jet, drop on demand, or thermal transfer printers, or laser ablation or other laser marking devices. The substrate may be any desired substrate, including porous and non-porous materials, primary and secondary packaging, and the products themselves, including consumer products.

The printer is controlled to print a product code on the substrate. A standard product code 10 may include a single line of characters 12, as shown in FIG. 1. The line 12 includes a plurality of characters from a set of unmodified characters. In the Example shown in FIG. 1, the letters YY signify the year; MM the month; and HH the hour, which may be depicted as numbers, letters, or other characters. 'XYZ' and '123' are further letters and/or numbers that vary with the production of individual products that form the substrate. For example, they may be sequential batch codes or lot numbers. The characters may be alphanumeric characters, characters from any language (including Asian characters), or other symbols. It will be appreciated that a variety of product codes are possible beyond the specific examples depicted herein.

Figure 2:
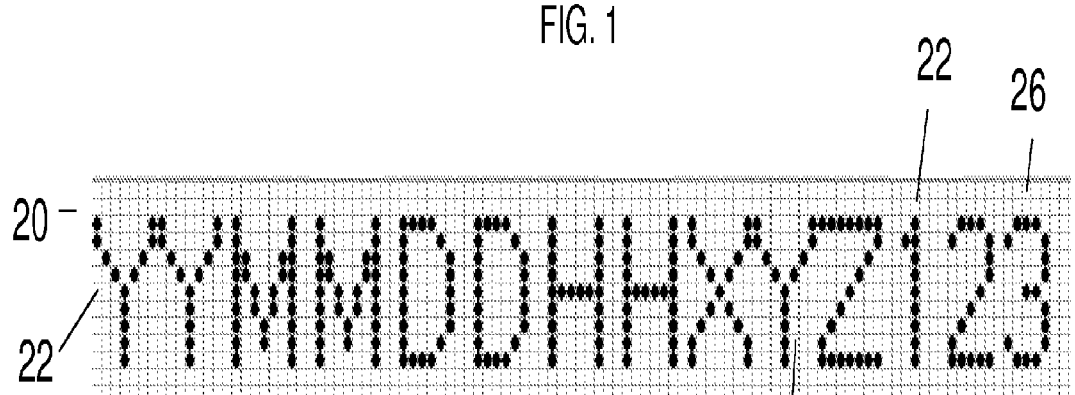
FIG. 2 shows an embodiment of the printed code of FIG. 1 with a modified character.

A modified product code 20 is determined from the unmodified or initial product code 10 and includes a covert feature, as shown in FIG. 2. By 'covert' is meant that it is not generally noticeable as a code to the casual consumer. The product code 20 includes a covert code which may be used to verify the authenticity of the article. The covert code includes a modified character 24, which is a modified version of the standard corresponding character 14 from code 10. In the depicted example, the character '1' has a dot or pixel removed from the top portion. The product code 20 is preferably visible to the unaided eye.

The controller determines the product code. The characters of the product code other than the modified character are selected or determined by methods known in the art and may be based, for example, on the date, the type of product, the location of production, and so forth. The controller also selects the modified character by a suitable algorithm, as described below.

Figure 3:
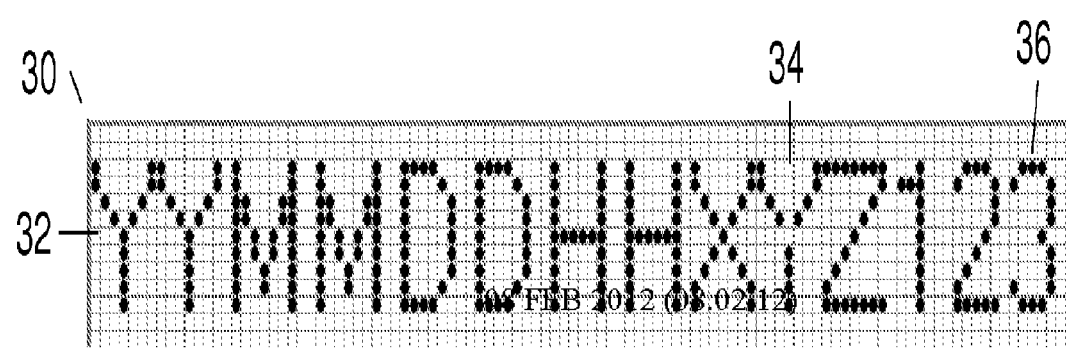
FIG. 3 shows an embodiment of the printed code of FIG. 1 with a different modified character.
Figure 8:
FIG. 8 shows a substrate that has been laser marked with both a standard font and a modified font.

Another embodiment 30 of a single line code is shown in FIG. 3. The line 32 includes a plurality of characters, like line 22 of the previous example. The product code 30 includes two covert codes which may be used to verify the authenticity of the article. The covert code includes modified characters 34 and 36. In the Example shown in FIG. 3, the character 'Y' 34 has a dot removed in the center, compared to the corresponding standard unmodified character 24, and the character '3' 36 has a dot removed in the center compared to the corresponding standard unmodified character 26. As in the previous example, the modified characters may be selected by a suitable algorithm, as described below.

By 'modified' is meant that the character is different from a corresponding character from the set of standard unmodified characters. The modified character 34 may be thought of as a subtle change in the appearance of the character as compared to a standard unmodified character, that is unlikely to be noticed as significant by the consumer.

The product code may also include two or more lines of code. A product code 40 including two lines of characters 42 and 44 is shown in FIG. 4. Each line 42, 44 includes a plurality of standard or unmodified characters. In the Example shown in FIG. 4, the letters YY signify the year; DDD the day; MMMM the minute, and SS the second, which may be depicted as numbers, letters, or other characters. 'ABC' and '1234' are further letters and/or numbers that vary with the production of individual products that form the substrate. As in the previous examples, the characters may be alphanumeric characters, characters from any language (including Asian characters), or other symbols.

An embodiment 50 of a two line product code including covert characters is shown in FIG. 5. Each of the first line 52 and the second line 54 includes a plurality of characters. The product code 50 includes a covert code which includes one or more modified characters 56, 58, each of which may be in either the first or second line. In the Example shown in FIG. 5, the character 'M' 56 has a dot removed in the right leg, and the character '4' 58 has a dot removed on the right side, compared to the corresponding unmodified characters 46, 48.

In another embodiment, the modified character does not have dots or pixels missing or removed per se but rather is of a different font than the standard character. FIG. 6 shows a standard product code 60 and a product code 62 with a modified character. The modified product code 62 including a covert feature which may be used to verify the authenticity of the article. The product code 62 includes a modified character 66, which is a modified version of the standard unmodified character 64. In the depicted example, the character 'Y' 66 in the modified code is of a different font than the 'Y' 64 in the standard product code 60.

In another embodiment, the modified character is a non-alphanumeric image such as an arbitrary figure or logo. FIG. 7 shows a portion of a standard product code 70 that includes an image 74 in the top line, which may be a logo or other arbitrary image. The bottom line of FIG. 7 is a portion of a product code 72 with a modified image 76. In the depicted example, the modified image 76 is missing a dot from standard image 74. The use of such an image may be used independent from or combined with the previously described modified character. The modification of such an image may be controlled by a suitable algorithm. For example, the modification may occur only under certain conditions (e.g. may be triggered by the alphanumerical or other values of the code 70).

Figure 9:
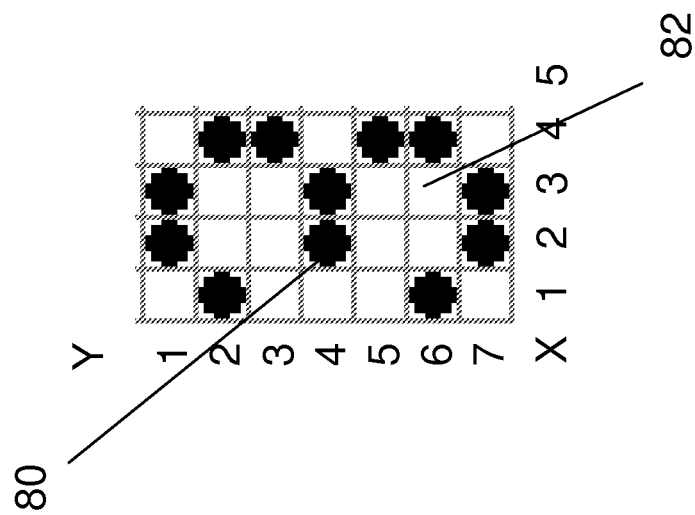
FIG. 9 shows the character '3' from a 5×7 font.

FIG. 9 shows a substrate that has been marked by a laser marking device with characters in both a standard font (first and third row) and in a modified font with a missing portion (second and fourth row). The modified font has portions removed, but could also have portions added and/or moved.

The product code as disclosed herein may include a variety of types of codes, including a batch code, a time date code, and a serial number. In one embodiment, for a two line code, one of the first line and the second line includes a fixed code and the other of the first line and the second line includes a variable code.

The present method provides security features to deter counterfeit products. The modified character provides a security feature that is generally not noticeable by consumers or counterfeiters but can be used by those trained to help verify genuine product. The modified character is difficult to print with standard printers, so it will be difficult to copy by counterfeiters. The selection of which characters are used to make the modified character or the specific way in which the character is modified can be used to provide a covert security feature, i.e. only someone with knowledge of the specific algorithm used to select the component characters can verify the proper ones are selected or that the characters are modified in the proper way. In particular, the same algorithm that determines the code can be used in reverse to determine if the code is genuine. Alternatively, a look up table or the like could be used to determine the authenticity of the code.

The modified code is printed similar to the way any conventional character is printed. A digitized raster can be determined by rasterizing the modified code or the component characters thereof. The digitized characters for the possible modified characters are determined and stored in the printer controller. For example, the modified version of each character may have the same given dot or pixel removed and/or added each time the modified character is used. Alternatively, the location of the removed and/or added dot or pixel may be determined by an algorithm. Similarly, if a modified font is used for the modified character, the same font may be used each time for the modified character, or a selection of fonts may be chosen based on an algorithm.

To print the modified character(s), a controller for the printer may dynamically provide the code by selecting from pre-configured modified characters. For continuous inkjet printing, for example, appropriate drop charge values are determined by conventional methods for each modified code and stored in the controller. Then, during printing, after calculating and selecting the appropriate modified character from the algorithms described above, the controller causes the printer to print the modified character in the same fashion as a conventional character. Rather than being predetermined, the appropriate printing instructions for the desired modified character could also be determined while printing, although this may slow down the printing process.

The product code can use different colors among the line or lines of code and the modified character. The present method may also be used in conjunction with a bar code, such as either a linear bar code or a two dimensional bar code. In one embodiment, the present method and product code does not include a bar code and/or is not used in conjunction with a bar code.

The particular character(s) within the product code used to provide the modified character will typically be a function of some or all of the characters of the initial product code, such as by a mathematical algorithm Thus, an algorithm may be used to select which particular characters within the product code are used to provide the modified character. For example, the modified character may be the mth character, where 'm' may be based on a variety of factors, including the characters in the code, the time, date, batch number, etc. The algorithm may be based on encryption factors so that the correct m characters can only be selected through the use of a code, making it difficult for counterfeiters to determine the correct code.

The algorithm may be calculated by performing a mathematical operation on the components numbers and/or letters of the printed code. A suitable algorithm for a single line code is set forth as follows. A value, S, is formed by simply taking all numeric values (skipping non-numeric characters) in the line of print reading left to right. The digital root of S is then taken yielding C. C will be between 1 and 9. The modified character will be formed from the characters numbered C. As an example, the printed code is 20120208CCHY123. So, S=20120208123; C=3. Thus, the modified character is formed from the third character, '1'.

A similar algorithm can be used for a code with two modified characters. A value, S, is formed by simply taking all numeric values (skipping non-numeric characters) in the line of print reading left to right. S1 is formed by removing the even digits (i.e., the second, fourth, etc. digits in the sequence) and S2 is formed by eliminating odd digits. The digital roots of S1 and S2 are then taken yielding C1 and C2. C1 and C2 will be between 1 and 9. The modified character will be the characters numbered C1 and C2.

Another suitable algorithm is set forth as follows. A string, S, is formed by simply taking all alphanumeric values (skipping non-alphanumeric characters) in the line of print reading left to right. S1 is formed by removing the even characters in the sequence and S2 is formed by removing the odd characters in the sequence. The digital roots of S1 and S2 are then taken yielding C1 and C2. Alpha characters will be considered to have their value given by the mapping of A=1 through Z=26 (lower and upper case will not be distinguished). C1 and C2 will be between 01 and 9. The modified character will be formed from the characters numbered C1 and C2.

A similar algorithm may be used to select which particular characters within the product code are used to provide the modified character for a two line code. One suitable algorithm for selecting the characters for the modified character for a two line print code is set forth as follows. Two secret coverts, covert1 and covert2, are created using a combination of any character values from 0-255 ASCII. The length of covert1 will correspond to the number of characters in the first line of print. The length of covert2 will correspond to the number of characters in the second line of print. The first character position m is determined as follows: for each character in the first line of print, add corresponding character from covert above. This will form new character array cArray1. Reduce cArray1 to a single number by XOR'ing cArray1 members together. Mod result by the number of characters in first line. This will yield the character position m from the first line to incorporate into the modified mark. The second character position n is calculated as follows: for each character in second line of print, add corresponding character from covert above. This will form new character array cArray2. Reduce cArray2 to a single number by XOR'ing cArray2 members together. Mod result by the number of characters in second line. This will yield the character position n from line 2 to incorporate into the modified mark.

Another suitable algorithm is set forth as follow. All numeric values (skipping letters) in each line of print are added. These totals are designated S1 and S2 for lines 1 and 2 respectively. Two checksums, C1 and C2, are created such that when they are added to S1 and S2, the result is an even multiple of 10. Mod C1 and C2 by the number of characters in printed line 1 and 2 respectively, creating I1 and I2. Character positions, I1 and I2, in lines 1 and 2 are used select the characters that are combined to create the modified character. Although example algorithms are provided, any suitable algorithm known in the art may be used with the present methods.

Example

As previously described, besides selecting which character is modified, how the character is modified may also be determined by an algorithm. The way in which the character is modified will typically be a function of some or all of the characters of the product code, such as by a mathematical algorithm. The following is an example of method for dynamically determining how to modify a character to provide a covert code. FIG. 9 shows the character '3' from a 5×7 font for a CU printer. Each cell may be defined by giving the x and y coordinate and the state of that cell. A state of 1 represents a pixel or drop of ink and a state of 0 represents the absence of a pixel or drop of ink. The character in a 5×7 font may be thought of as 35 (5×7) of these cells. Each cell can be represented by 3 numbers (x, y, s) as follows. The numbers (2, 4, 1) identify cell 80 in FIG. 9, which has a drop of ink. The numbers (3, 6, 0) identify cell 82 in FIG. 9, which does not have a drop of ink.

Now consider the following 3×3 matrix A shown in Table 1:

TABLE 1

| 1 | 2 | 3 |
| 4 | 5 | 6 |
| 7 | 8 | 9 |

This matrix defines possible ways to move 1 cell in any direction. The original cell is defined to be at position 5 in the above matrix. Further consider the following 3×3 matrix B in Table 2:

TABLE 2

| 0 | 0 | 0 |
| 1 | 1 | 0 |
| 1 | 0 | 0 |

The matrix of Table 2 defines the acceptable ways a particular cell can be moved. Unacceptable locations may include, for example, cells outside the 5×7 area, cells that would make the modified character look like another character, or cells that already have a droplet. For each character, there will be a matrix B for each cell that contains a drop of ink. These matrices will be part of the font and designed in such a way so that the integrity of the original character is not compromised during the dynamic font alteration described below. Thus, in an embodiment, an algorithm uses information on the acceptable characteristics of the modified character. It is desirable that the modified character should still be recognizable as the original character and not easily mistaken for another character. Matrix B can be represented using the terminology Bxy, where x and y locate the cell to which the matrix B is defined, keeping in mind that this matrix is only defined for a cell containing a drop; using the notation defined earlier, cells with a 1 as their 3rd coordinate, e.g. (2, 4, 1). A value of 1 in matrix B permits the cell to be moved into that position and a value of 0 restricts the move into that position. The cell to be moved is positioned at the center of the matrix B.

The following is an example of an alteration algorithm (applied after selecting a character within the code using previously documented algorithms):

1. Generate a random number between 1 and the character width, which is 5 in this case.
2. Generate a random number between 1 and the character height, which is 7 in this case.
3. Check for the presence of a drop at the x and y coordinates obtained in steps 1 and 2.
4. If a drop is not found go back to step 1; if a drop is found, continue to step 5.
5. Compute the digital root of the product code, which will yield a number between 1 and 9.
6. Use the result in step 5 to identify the desired move using matrix A defined above.
7. Check the validity of the desired move by referencing matrix Bxy.
8. If valid move cell.

Example

Figure 10:
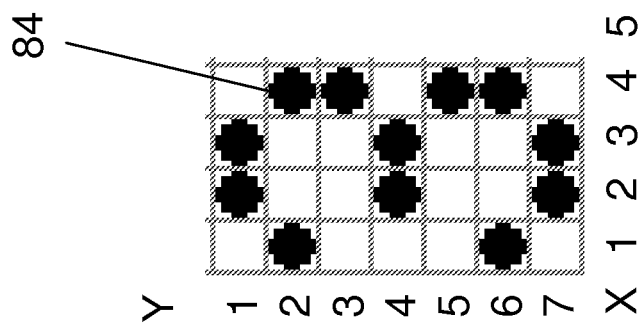
FIG. 10 shows an embodiment of the character '3' before modification.

Consider the code=1234AB226B. Random numbers are calculated as (x, y) as 4 and 2. This locates cell 84 in FIG. 10. The digital root (using for letters the corresponding numbers, e.g. A=1, B=2) of the code is 7. So the desired move is from square 5 in Table 3 below to square 7:

TABLE 3

| 1 | 2 | 3 |
|---|---|---|
| 4 | 5 | 6 |
| 7 | 8 | 9 |

Figure 11:
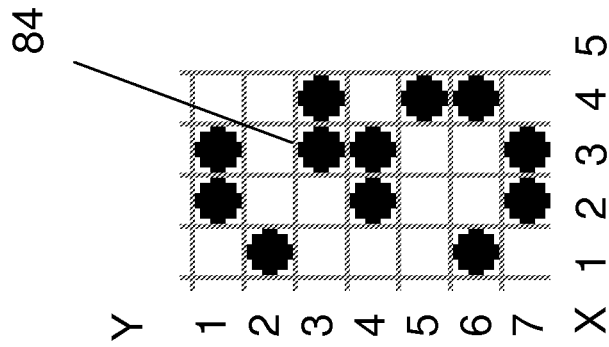
FIG. 11 shows an embodiment of the character '3' after modification.

Now using the matrix B, we check the validity of the move by looking in the same element in the corresponding Matrix B from Table 2 above. Matrix B has a "1" in the corresponding square to square 7, so the move is permissible. The final character looks as shown in FIG. 11, with dot 84 moved to a new location. It should be considered that this particular algorithm (intentionally) does not always modify the character. For instance if the digital root yields 5, the cell does not move. Additionally, if the move is not permissible, the cell does not move. Suitable changes can be made to ensure that the character is modified in each case. It will be apparent that similar algorithms can be used for removing or adding a droplet to provide the modified font. It will also be apparent that other algorithms may be used to modify the font.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A method of printing a modified product code, comprising:
   providing a printer;
   providing a substrate;
   determining an initial product code, wherein the initial product code comprises a plurality of unmodified characters from a set of unmodified characters;
   determining a modified product code, wherein the modified product code comprises at least some of the plurality of unmodified characters from the initial product code and at least one modified character that is different from a corresponding one of the plurality of unmodified characters of the initial product code and is a function at least in part of the initial product code; and
   using a controller comprising raster information to print the modified product code on the substrate.

2. The method of claim 1 further comprising using an algorithm to select the identity of the modified character, which is a function at least in part of the characters of the initial product code.

3. The method of claim 2 wherein the algorithm comprises summing the values of characters of the product code to select the character to modify.

4. The method of claim 1 further comprising using an algorithm to select the characteristics of the modified character, which is a function at least in part of the characters of the initial product code.

5. The method of claim 4 wherein the algorithm uses information on acceptable characteristics of the modified character.

6. The method of claim 1 wherein the substrate is part of a consumer product.

7. The method of claim 1 wherein the modified product code comprises a covert code.

8. The method of claim 1 wherein the modified character comprises an unmodified character from the initial product code that has a portion removed and/or added.

9. The method of claim 8 wherein the portion comprises a pixel or a drop.

10. The method of claim 1 wherein the modified character comprises a character that is of a different font type than a font type of the corresponding one of the plurality of unmodified characters.

11. The method of claim 1, wherein the modified product code comprises:
   a first line comprising a first portion of the plurality of unmodified characters;
   a second line disposed under the first line and comprising a second portion of the plurality of unmodified characters; and
   a covert code comprising one modified character from the first line and one modified character from the second line.

12. The method of claim 1 wherein the printer is a continuous ink jet printer.

13. The method of claim 1 wherein the printer is a thermal ink jet printer.

14. The method of claim 1 wherein the printer is a laser marking device.

15. A product with counterfeit protection, comprising:
a consumer product;
a product code printed on the consumer product, the product code comprising:
a plurality of characters selected from a set of unmodified characters; and
a covert code, where the covert code comprises at least one modified character that is different from an unmodified character from the set of unmodified characters and is a function at least in part of the characters of the product code wherein the modified character comprises an unmodified character that has a portion removed and/or added.

16. The product of claim 15 wherein the modified character comprises a character that is of a different font type than a font type of the corresponding one of the plurality of unmodified characters.

17. The product of claim 15 wherein the selection of the modified character is a mathematical function of the characters of the product code.

18. The product of claim 15 wherein the characteristics of the modified character are a mathematical function of the characters of the product code.

19. The product of claim 15 wherein the covert code comprises two or more modified characters.

20. The product of claim 15 wherein the product code comprises one or more of a batch code, a time date code, and a serial number.

21. The method of claim 15 wherein the portion comprises a pixel or a drop.

22. A method of printing a modified product code, comprising:
providing a printer;
providing a substrate;
determining an initial product code, wherein the initial product code comprises a plurality of unmodified characters from a set of unmodified characters;
determining a modified product code, wherein the modified product code comprises at least some of the plurality of unmodified characters from the initial product code and at least one modified character that is different from a corresponding one of the plurality of unmodified characters of the initial product code and is a function at least in part of the initial product code, wherein the modified character comprises an unmodified character from the initial product code that has a portion removed and/or added; and
controlling the printer to print the modified product code on the substrate.

23. The method of claim 22 further comprising using an algorithm to select the characteristics of the modified character, which is a function at least in part of the characters of the initial product code.

24. The method of claim 22 wherein the portion removed and/or added comprises a pixel or a drop.

25. The method of claim 22 further comprising using an algorithm to select the identity of the modified character, which is a function at least in part of the characters of the initial product code.

* * * * *